United States Patent [19]
Cearns et al.

[11] Patent Number: 5,943,149
[45] Date of Patent: Aug. 24, 1999

[54] OPTICAL MULTIPLEXOR/ DEMULTIPLEXOR USING A NARROW BAND FILTER FOLLOWED BY A WIDEBAND FILTER

[76] Inventors: Kevin J. Cearns, 1006-2710 Saratoga Place, Gloucester, Ontario, Canada, K1T 1Z2; Calvin Si, 13 Mullcraft Crescent, Nepean, Ontario, Canada, K2J 4P8

[21] Appl. No.: 09/025,468

[22] Filed: Feb. 18, 1998

[51] Int. Cl.$^6$ .............................. H04J 14/02; G02B 1/10; G02B 5/28
[52] U.S. Cl. .......................... 359/124; 359/584; 359/589; 385/24
[58] Field of Search .................................... 359/124, 589, 359/584; 385/24

[56] References Cited

U.S. PATENT DOCUMENTS 5,629,995  5/1997  Duck et al. ................................. 385/24
5,652,814  7/1997  Pan et al. ................................... 385/24

*Primary Examiner*—Cassandra Spyrou
*Assistant Examiner*—Jennifer Winstedt
*Attorney, Agent, or Firm*—Neil Teitelbaum & Associates

[57] ABSTRACT

This invention relates to an optical demultiplexor having a narrow band filter for separating a narrow band channel prior to utilizing one or more wide band filters for separating a plurality of channels into groups of channels. The groups of channels can then be further separated or demultiplexed by a plurality of narrow band filters. Advantageously, a plurality of closely spaced (i.e. 50 Ghz) channels can be separated using conventional dichroic filters.

17 Claims, 6 Drawing Sheets

OPTICAL MULTIPLEXOR/ DEMULTIPLEXOR USING A NARROW BAND FILTER FOLLOWED BY A WIDEBAND FILTER

FIELD OF THE INVENTION

This invention relates generally to optical filters and more particularly to an arrangement of optical filters for multiplexing and/or demultiplexing optical signals wherein power losses and differences in power loss for different channels usually associated with such demultiplexors is substantially lessened.

BACKGROUND OF THE INVENTION

Optical systems are presently being employed in the communication of voice and video information as well as in the high-speed transmission of data. Optical communication systems are desired because of the wide bandwidth available for the information signal channels.

Although this wide bandwidth is available, many of the existing optical fiber systems use only a single channel per optical fiber. Typically, this channel is transmitted at a wavelength in the 1500 nm band in one direction from a transmitting end to a receiving end and requires a second optical fiber to achieve bi-directional communication; however, recent increase in telecommunications traffic has resulted in a need for further fiber resources. One way this need was met, was to install additional optical fiber cables. Another was to increase the number of channels carried by same fibers.

Recently, technologies that can add additional channels to existing optical fiber cables already in the ground, have gained acceptance. These technologies seek to provide more than one channel on a single existing optical fiber and are therefore aimed at enhancing the efficiency of the existing fiber optic cable network. These technologies include wavelength division multiplexing (WDM) and bidirectional transmission.

When a number of wavelengths are multiplexed and transmitted on a single optical fiber, customarily, these channels must later be demultiplexed into separate channels or wavelengths of light. For example, it may be cost effective to transmit signals of wavelength $\lambda 1, \lambda 2, \lambda 3, \lambda 4, \lambda 5$, and $\lambda 6$ ($\lambda$ denoting a wavelength, lambda) along a single optical fiber, however, demultiplexing means are required to separate the light into six separate channels. Of course, it is desired to perform this demultiplexing at a minimum cost and with as little signal loss as possible. Furthermore, if signal loss exists, it is important for any signal loss present on any channel to be of a similar magnitude for all channels being demultiplexed.

There are several technologies that can be used to construct WDM filters. For example, etalon technology, diffraction grading technology, fused biconic taper technology, and holographic filter technology. One technology that has proven to be widely useful in the telecommunications industry is dichroic filter technology. This technology offers wide channel passbands, flat channel passbands, low insertion loss, moderate isolation, low cost, high reliability and field ruggedness, high thermal stability, and moderate filter roll-off characteristics.

An illustrative example of a conventional three-port dichroic filter 300 is shown in prior art FIG. 3. A dichroic filter is comprised of one or more layers of dielectric material coated onto a, for example, glass substrate 305 with lenses 310 to focus the incoming and outgoing optical signals. The choice of dielectric material, the number of dielectric layers coated onto the substrate, and the spacing of these layers are chosen to provide the appropriate transmissive and reflective properties for a given "target" wavelength. For example, if $\lambda 1$ is the target wavelength to be transmitted through the filter, the number and spacing of the dielectric layers on the substrate 305 would be chosen to provide (1) a specified passband tolerance around $\lambda 1$ and (2) the necessary isolation requirements for all other transmitted wavelengths, for example, a wavelength, $\lambda 2$, transmitted by a second transmitter.

The dichroic, or WDM, filter is constructed by placing self-focusing lenses, such as "SELFOC" lenses 310, on either side of the dielectric substrate 305. "SELFOC" lens 310 collimates incoming light ($\lambda 1$ and $\lambda 2$) at the dielectric substrate.

Attached to the "SELFOC" lenses through an adhesive bonding process are, typically, single-mode optical fibers. For convenience, the locations at which optical fibers attach to the "SELFOC" lenses 310 are called ports: port 1 320, port 2 325, and port 3 330. Connected to the ports are optical fibers 335, 340, and 345 respectively.

For example, all of the light (comprised of $\lambda 1$ and $\lambda 2$) passing through fiber 335 connected to port 1 320 is collimated by lens 310 at the dielectric substrate 305.

Since the substrate is coated to pass wavelengths around $\lambda 1$, virtually all of the light at $\lambda 1$ passes through the dielectric substrate 305 and, via the second "SELFOC" lens, is focused into port 3 330, and passes away from the filter on optical fiber 345. Any other wavelength incident on the filter through port 1 320 (e.g., light of wavelength $\lambda 2$) is reflected off the multi-layer substrate, focused back through the first "SELFOC" lens to port 2 325, and passes away from the filter on optical fiber 340. Likewise, the filter performs the same function for light traveling in the opposite direction.

Heretofore, it has been common practice, to sequentially arrange or cascade optical filters such that a first, second, third, ... and nth wavelength are removed or separated from an optical signal comprising n wavelengths or channels, sequentially by n cascaded optical filters. Generally, after a first wavelength or channel is removed, the remaining n-1 channels are reflected backward to the remaining n-1 cascaded filters. Subsequently after a second wavelength or channels is removed, the remaining n-2 channels are reflected backward to the remaining n-2 cascaded filters, and so on. Of course it is well known that as the nth wavelength of the optical signal propagates along such a chain of n filters, signal power loss occurs along the chained path. This signal power loss is a result of both the overall distance that the signal must travel, and, more importantly much of the power loss occurs at each GRIN lens fibre interface or port.

Hence, channel 2 which must encounter two filter elements prior to be being removed or demultiplexed from the multiplexed signal channels undergoes less loss, than for example, channel 16 which encounters 16 filter interfaces.

As was stated heretofore, preferably, when a demultiplexor separates a group of channels into individual channels losses for each channel should most importantly be minimal and it is preferable that any losses introduced by the system should be as near to equal as possible for all channels. This is not the case with conventional demultiplexor designs using a conventional arrangement of cascaded narrow band dichroic filters.

It is therefore an object of this invention to provide a system for multiplexing and demultiplexing wherein overall signal loss is minimized.

It is a further object of this invention, to lessen the effects unequal loss due to sequentially removing n channels, one at a time in a conventional, sequential manner.

It is also an object to provide a filtering system wherein less expensive filters having poor (less steep) slopes can be used to separate groups of channels having suitable channels spacing between said groups.

It is also an object of the invention, to first provide suitable channel spacing between groups of channels such that inexpensive wide band filters can be used to separate the groups of channels prior to demultiplexing said groups.

It is an object of this invention to provide a system wherein sequential optical channels having a 100 Ghz channel spacing or less can be demultiplexed using conventional dichroic optical filters.

SUMMARY OF THE INVENTION

In accordance with the invention, there is provided, an optical filter arrangement for demultiplexing an optical signal having a plurality of channels, said filter arrangement comprising at least two filters, at least a first optical filter for separating a group of channels into a lower and a higher wavelength group of channels, each group comprising a plurality of channels, and a second optical filter for filtering and separating from the optical signal at least one channel having a central wavelength between the lower and the higher wavelength groups of channels, the at least two filters being optically coupled to one another such that the at least a channel between the lower and higher wavelength group of channels is first removed from the optical signal by the second filter before said lower or higher wavelength groups of channels are removed by the first optical filter respectively.

In accordance with the invention, there is further provided, an optical demultiplexor for demultiplexing an optical signal having at least n sequential channels into a plurality of channel groupings, wherein n >3, each channel having a different central wavelength, each of n-1 of the n channels having lower central wavelength than a subsequent sequential channel, the $n^{th}$ channel having a highest central wavelength and the $1^{st}$ channel having the lowest central wavelength, said demultiplexor comprising:

a plurality of sequentially, interconnected, optically-coupled, optical filters, including at least a narrow band filter for separating and removing at least a single channel having a central wavelength corresponding to a channel between the $1^{st}$ and the $n^{th}$ channel from the plurality of channels and at least a filter for separating at least two groups of different channels adjacent the single channel after the single channel has been removed, a first of the two groups of channels having central wavelengths below the wavelength of the at least single channel, and a second of the two groups having central wavelengths above the wavelength of the at least single channel.

In accordance with the invention, there is provided, an optical filter arrangement comprising a plurality of filters said filters including at least a narrow band filter and a wide band filter, the narrow band filter disposed to first filter a narrow wavelength band of light and the wide band filter disposed to subsequently filter and separate wide wavelength bands of light.

In accordance with another aspect of the invention, method of demultiplexing a plurality of sequential channels from an optical signal is provided comprising the steps of: first filtering a narrow band channel having a wavelength that is substantially in the middle of a range of wavelengths of the plurality of sequential channels to remove the narrow band channel from the plurality of sequential channels; and, subsequently separating remaining channels into two groups of channels a first group having central wavelengths below the wavelength of the narrow band channel, and a second group having central wavelengths above the wavelength of the narrow band channel.

BRIEF DESCRIPTION OF THE DRAWINGS

Exemplary embodiments of the invention will now be described in conjunction with the drawings, in which:

FIG. 2b is a graph of an output response for the circuit shown in FIG. 2a;

DETAILED DESCRIPTION

Figure 1:
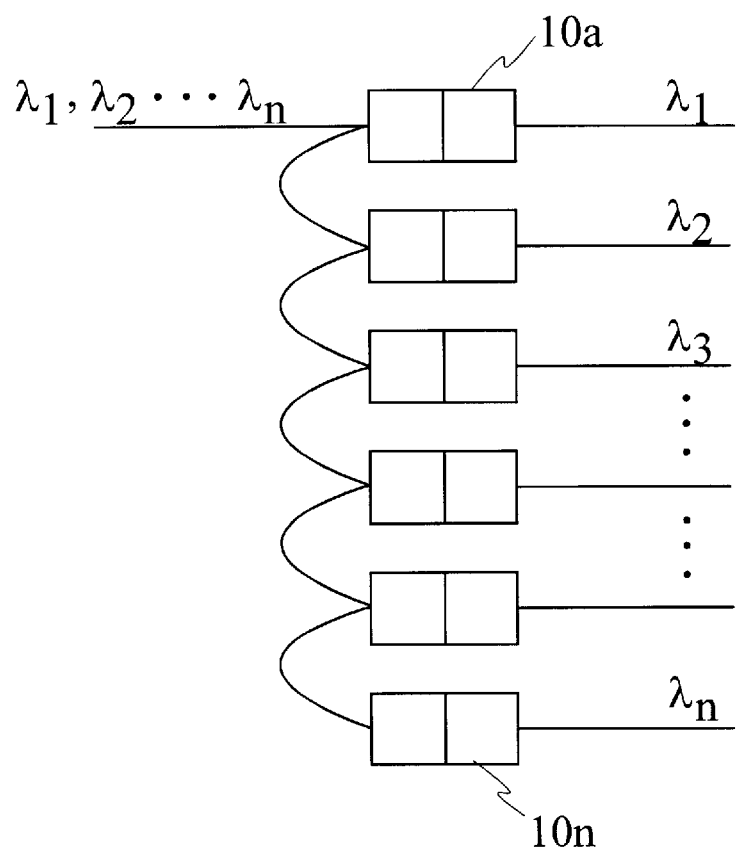
FIG. 1 is a schematic block diagram of a prior art multi-channel WDM wherein continuous cascading occurs.

FIG. 1 shows a cascaded prior art circuit wherein dichroic filters 10a through 10n each having a different wavelength response are serially interconnected in a cascaded arrangement to demultiplex a multiplexed optical signal comprising channels 1 to n, corresponding to wavelengths $\lambda1, \lambda2, \lambda3, \ldots \lambda n$. Since there is a fixed power loss associated with each filter in transmission, and a fixed but lesser power loss associated with each filter in reflection, those signals that reflect from a plurality of filters, will be more attenuated than for example signals that reflect from one or fewer numbers of filters.

More specifically, the attenuation due to reflection of channel from n will be n-2 times greater than the attenuation due to reflection loss of channel 2. Hence for dumultplexors having large numbers of channels, serially cascading filters is not preferred due to the large insertion loss for channels near the end of the series coupled filters, and furthermore, due the large differential channels loss, especially between channels at different ends of the series filters.

Figure 2A:
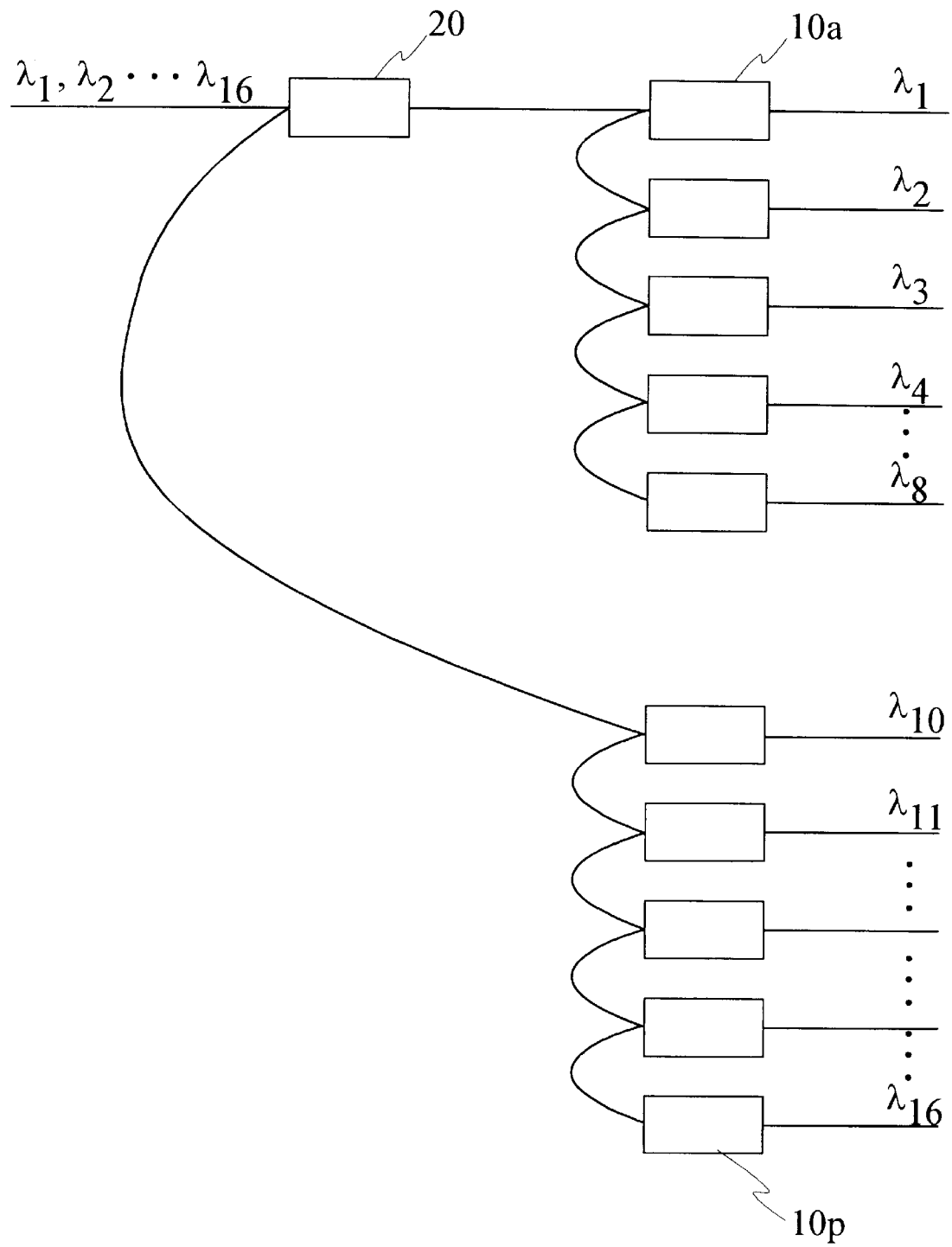
FIG. 2a is a schematic block diagram of a multi-channel WDM wherein channels are separated into two banks prior to be further demultiplxed.

FIG. 2a illustrates a cascaded demultiplexing/multiplexing optical system wherein a band splitter 20 first splits 16 channels into a first group of 8 channels comprising wavelengths $\lambda1, \lambda2, \ldots \lambda8$, and a second group of channels comprising wavelengths $\lambda10 \ldots \lambda16$. The first group of channels is then presented to a first bank of cascaded filters 10a through 10h, similar to the arrangement shown if FIG. 1. Similarly, the second group of channels is simultaneously presented to a second bank of cascaded filters 10j through 10p. Although this arrangement is advantageous with regards to lessening loss and lessening differences in attenuation between the $1^{st}$ and the $16^{th}$ channel over providing a single long cascaded group of 16 filters, one disadvantage to this arrangement is that one channel is missed; stated differently, there must be a channel spacing between the two groups of channels, such that the splitter can split channels 1 through 16 into two groups. This is illustrated in the graph shown in FIG. 2b.

Figure 2B:
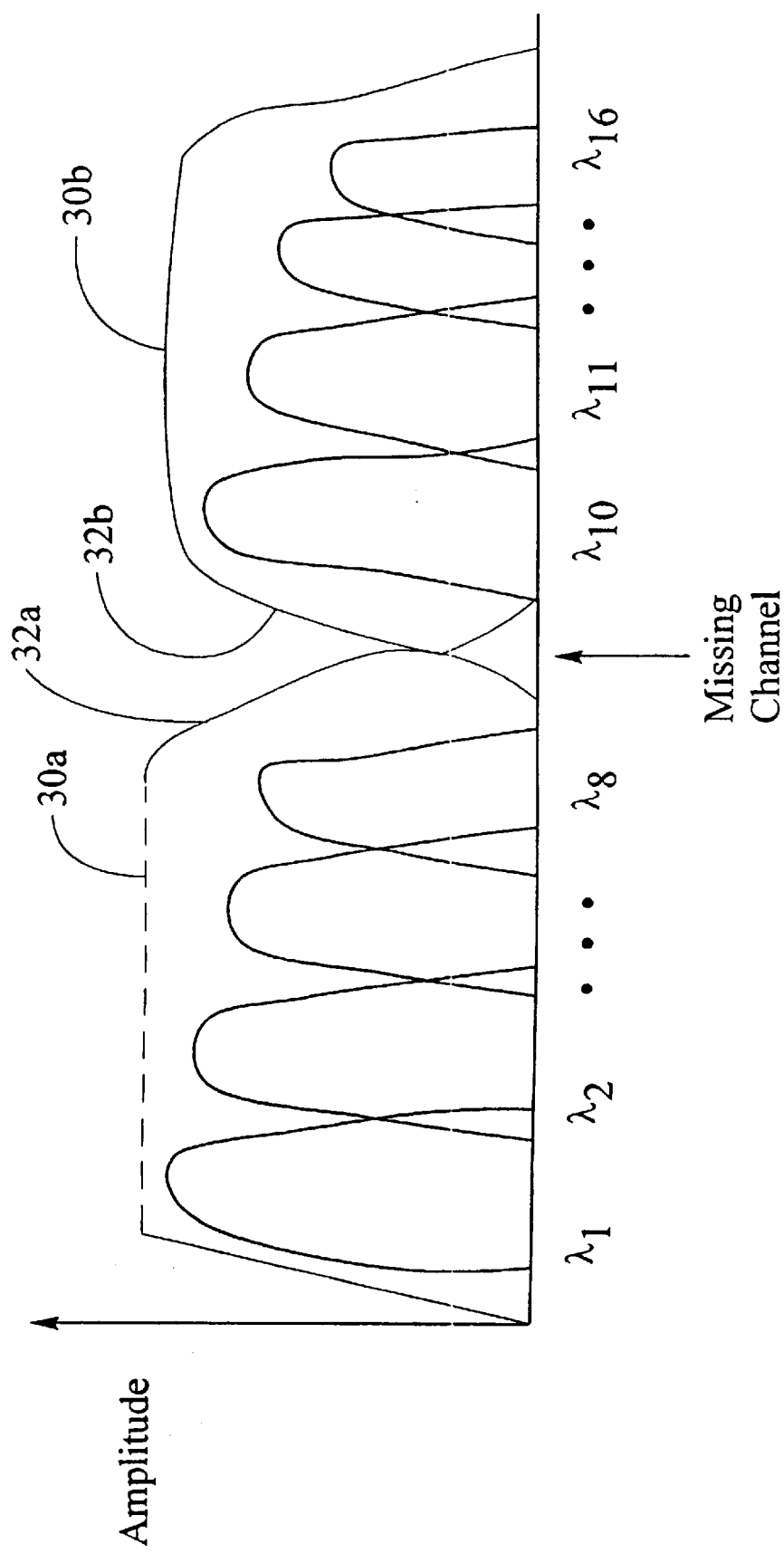
Figure 3:
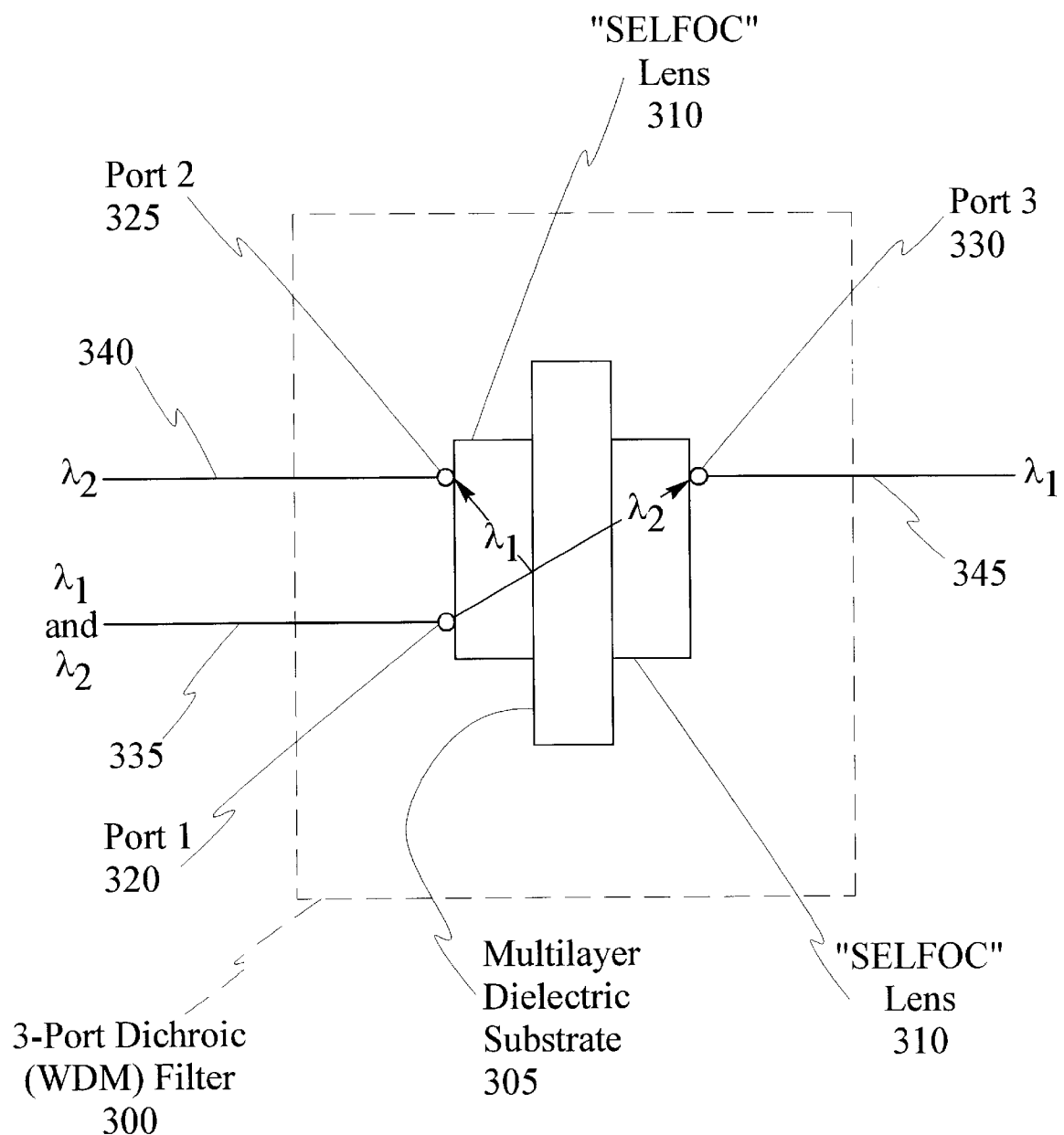
FIG. 3 is a prior art schematic block diagram of a prior art 3-port dichroic WDM filter.

Turning now to FIG. 2b, the response of the splitter 20 is shown in dotted outline 30a and 30b. Since the splitter comprises two wide band filters, or alternatively a low and high pass filter having a less than ideal slope 32a and 32b, a channel is missed or lost, and channels on either side of the missing channel are separated into two streams as described above. The figure also illustrates how the first channel of each bank has greater amplitude than subsequent channels in that bank which are progressively attenuated.

Figure 4:
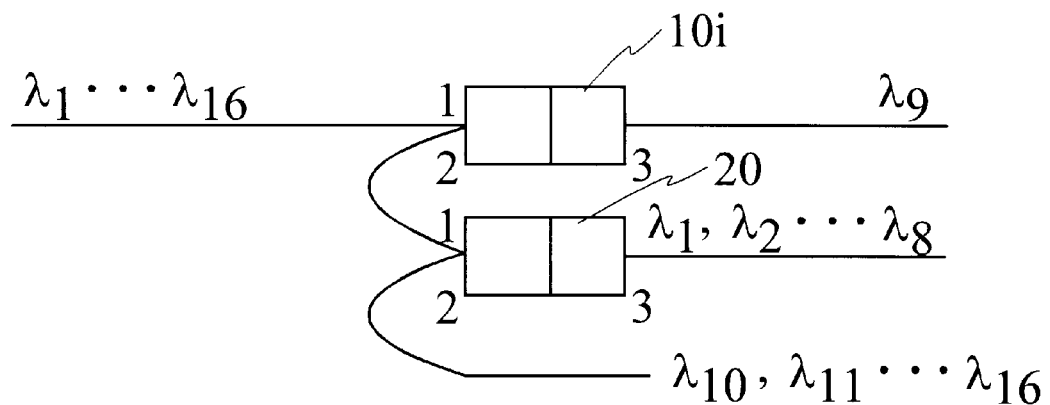
FIG. 4 is a schematic block diagram of a system wherein a narrow band filter is first used to remove a single narrow band channel.

Referring to FIG. 4, and in accordance with the invention, an arrangement of filters is provided which obviates the disadvantage of the circuit shown in FIG. 2a, wherein densely spaced channels are provided and a central channel is lost. FIG. 4 provides circuitry wherein a single narrow band channel between two banks of channels, is first removed or demultiplexed, leaving space for wide band filters (or a high and low pass filter) to separate the channels on either side into two groups for further filtering/demultiplexing.

Figure 6:
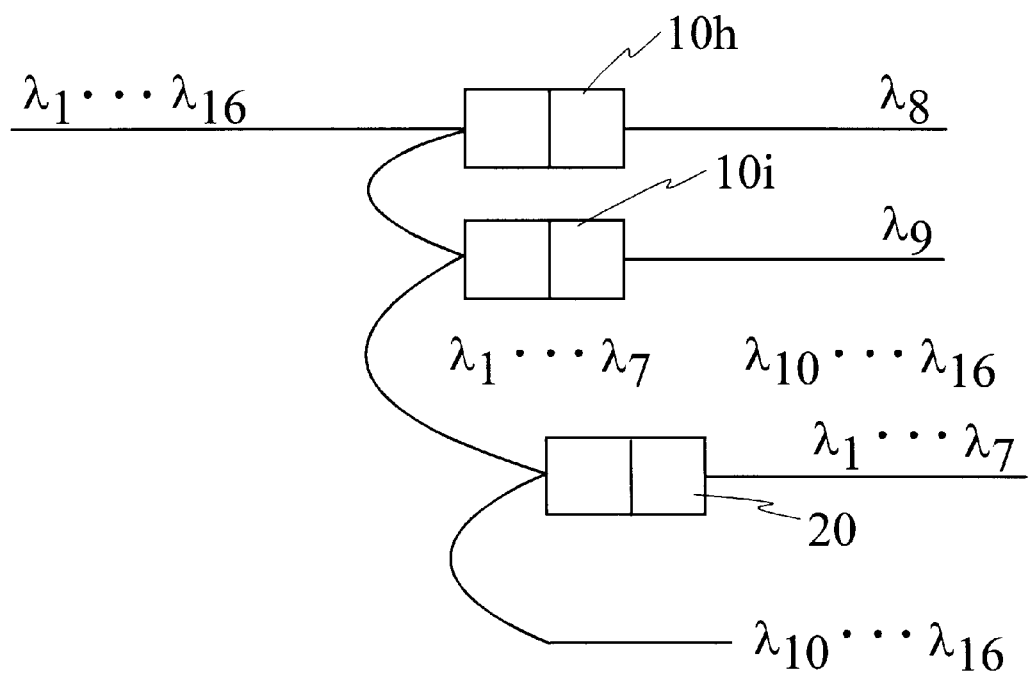
Figure 5:
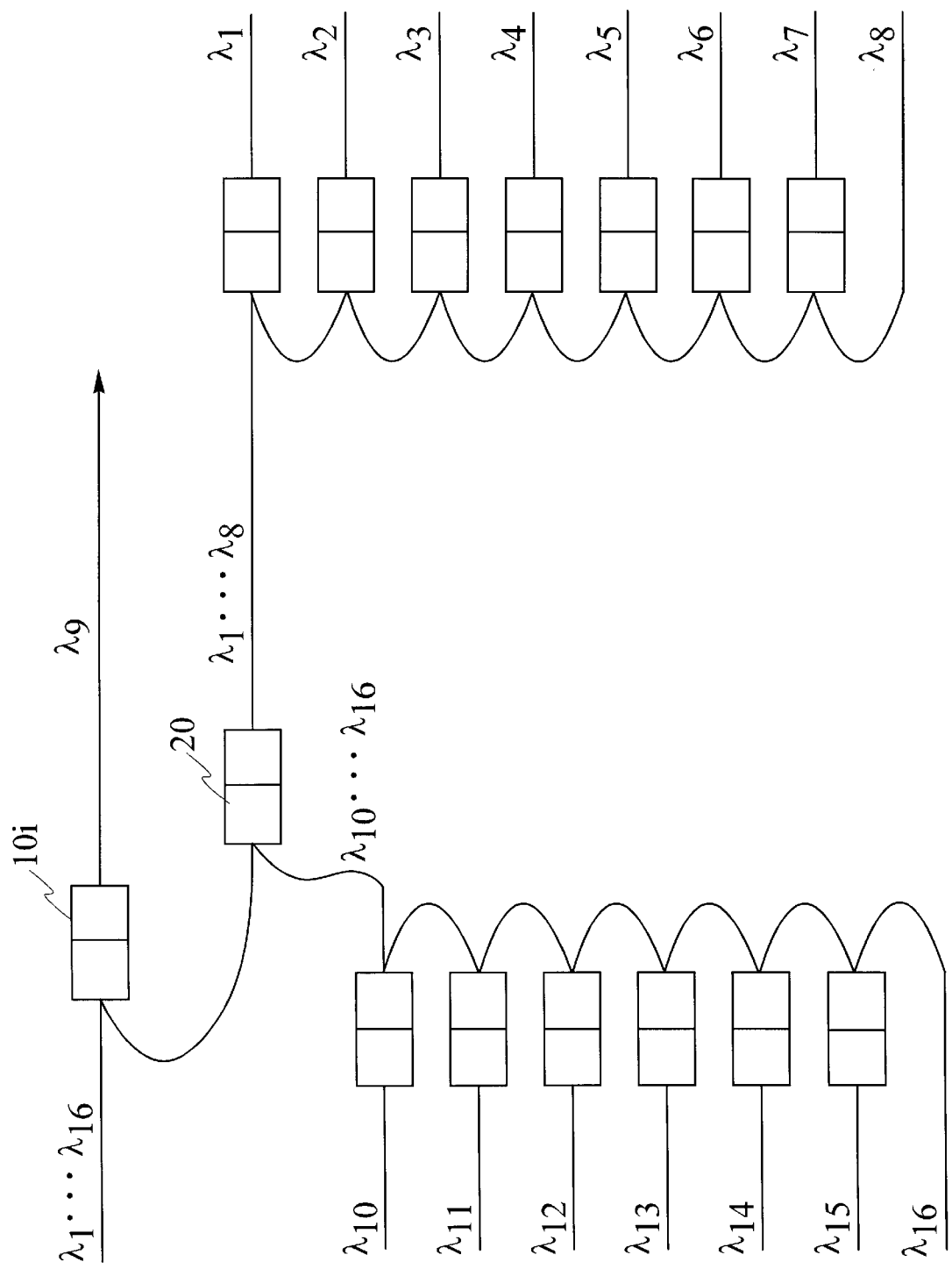
FIG. 5 is a schematic block diagram of a system wherein a single narrow band channel is first removed prior to demultiplexing two groups of channels simultaneously; and, FIG. 6 schematic block diagram of a system wherein two narrow band channels are first removed prior to demultiplexing the remaining channels.

In FIG. 4 a narrow band filter 10i designed to transmit a single narrow band channel, in this instance, $\lambda 9$ is optically coupled with a band splitter 20 in the form of a band pass filter designed to transmit channels 1 to 8 along a straight through transmit path from port 1 to port 3 of the filter, and to reflect channels 10 to 16 along another path from port 1 to the filter element and back to port 2. Since the output response of the splitter 20 is such, that space is required between the channels being split to achieve high isolation, channel 9 having a central wavelength $\lambda 9$ is first removed in this arrangement. FIG. 5 shows yet an extension to this embodiment, wherein the optical circuit of FIG. 4 is combined with the optical circuit of FIG. 2a, thus providing a demultiplexor where each of the 16 channels can be demultiplexed without suffering from the extreme effect of serially cascading 16 channels, and without suffering the loss of any of the channels. The band splitting filter, could be in the form of band pass filters or high and low pass filters. Conveniently, since the channel between the blocks of channels being demultiplexed has first been removed, the filters are not required to have particularly steep slopes. If however the filters are very "sloppy", i.e. if the slopes are not very steep, it may be required to provide greater isolation than is afforded by the removal of one channel, and two channels can first be removed prior to splitting blocks of channels adjacent the two channels. This can be accomplished by first passing the multiplexed signal through two narrow band filters. This is shown in FIG. 6.

In yet another embodiment (not shown), wherein 64 channels are provided, channels 32 and 33 are first dropped (or demultiplexed) by using two narrow band filters that are serially optically coupled. Subsequently, using wide band pass filters, or high and low pass filters, channels 1 to 31, and 34 to 64 are split into two groups of channels. Subsequent to providing two groups of channels, channels 1 to 31 are split in a similar fashion by using one or more narrow band filters to remove/demultiplex channel(s) 15 (and 16) and then channels 1 to 14 and 17 to 31 are separated into two sub-groups of channels. Similarly channels 34 to 64 can be demultiplxed by this repeated sequence of first removing one or more centrally located channels using one or more narrow band filters, and then subsequently using wide band filters or high and low pass filters to remove or demultiplex groups of channels, which can subsequently be demultiplxed using cascaded narrow band filters.

Advantageously, these schemes provide a means of lessening overall signal losses by dividing long sequential chains of filters into a plurality of banks of filters.

Furthermore, and advantageously, these aforementioned schemes lessen differences in attenuation between multiplexed signals having a great number of sequential closely spaced channels that is problematic in prior art devices.

Of course, numerous other embodiments may be envisaged, without departing from the spirit and scope of the invention. For example a Bragg filter can be used for separating a channel from the group of channels.

What we claim is:

1. An optical filter arrangement for demultiplexing an optical signal having a plurality of channels, said filter arrangement comprising at least two filters, a first narrow band optical filter for first filtering and separating from the optical signal at least one channel having a central wavelength between the lower and the higher wavelength groups of channels, and at least a second wide band optical filter for subsequently separating the lower and higher wavelength group of channels into two optical signals, each group comprising a plurality of channels, the at least two filters being optically coupled to one another such that the at least a channel between the lower and higher wavelength group of channels is first removed from the optical signal by the first filter before said lower or higher wavelength groups of channels are removed by the second optical filter respectively.

2. The optical filter arrangement as defined in claim 1, wherein the at least two filters each have at least three ports.

3. An optical filter arrangement as defined in claim 1, wherein at least a channel is a single, narrow band channel.

4. An optical filter arrangement as defined in claim 1, wherein the second filter comprises a plurality of wide band dichroic filters for demultiplexing some of the lower and the higher wavelength group of channels.

5. An optical demultiplexor for demultiplexing an optical signal having at least n sequential channels into a plurality of channel groupings, wherein n>3, each channel having a different central wavelength, each of n-1 of the channels having lower central wavelength than a subsequent sequential channel, the $n^{th}$ channel having a highest central wavelength and the $1^{st}$ channel having the lowest central wavelength, said demultiplexor comprising:

a plurality of sequentially, interconnected, optically-coupled, optical filters, including at least a narrow band filter for first separating and removing at least a single channel having a central wavelength corresponding to a channel between the $1^{st}$ and the $n^{th}$ channel from the plurality of channels and at least a wide band filter for subsequently separating at least two groups of different channels adjacent the single channel after the single channel has been removed, a first of the two groups of channels having central wavelengths below the wavelength of the at least single channel, and a second of the two groups having central wavelengths above the wavelength of the at least single channel.

6. An optical demultiplexor as defined in claim 5, wherein the at least a filter for separating at least two groups includes a dichroic wide band filter.

7. An optical demultiplexor as defined in claim 5, wherein the at least a filter for separating at least two groups includes at least a high pass or low pass filter.

8. An optical demultiplexor as defined in claim 7, wherein the filter has at least three ports, wherein one of the ports is for receiving channels corresponding to wavelengths below the wavelength of the at least single channel, and another of the ports for receiving wavelengths above the at least single channel.

9. An optical demultiplexor as defined in claim 6, wherein the filter has at least three ports, wherein one of the ports is for receiving channels corresponding to wavelengths below the wavelength of the at least single channel, and another of the ports for receiving wavelengths above the at least single channel.

10. An optical demultiplexor as defined in claim 5, wherein the filters have at least three ports, wherein one of the ports of one of the filters is for receiving channels corresponding to wavelengths below the wavelength of the at least single channel, and another of the ports for receiving wavelengths above the at least single channel.

11. An optical demultiplexor as defined in claim 5, wherein the narrow band filter is for removing only a single channel having a central wavelength corresponding to a channel substantially centrally disposed between the $1^{st}$ and the $n^{th}$ channel.

12. An optical filter arrangement comprising a plurality of filters said filters including at least a narrow band filter and a wide band filter, the narrow band filter disposed to first filter a narrow wavelength band of light from an incoming optical signal and the wide band filter disposed to subsequently filter and separate wide wavelength bands of light after the narrow wavelength band of light has been removed.

13. An optical filter arrangement as defined in claim 12, further comprising a plurality of narrow band filters disposed to receive wide wavelength bands of light and for filtering the wide wavelength bands into a plurality of narrow bands of light.

14. A method of demultiplexing a plurality of sequential channels from an optical signal comprising the steps of:

first filtering a narrow band channel having a wavelength that is substantially in the middle of a range of wavelengths of the plurality of sequential channels to remove the narrow band channel from the plurality of sequential channels; and, subsequently separating remaining channels into two groups of channels by passing the remaining channels to a wide band, a first group of the two groups having central wavelengths below the wavelength of the narrow band channel, and a second group having central wavelengths above the wavelength of the narrow band channel.

15. A method as defined in claim 14, further comprising the step of separating the first group of channels into individual channels.

16. A method as defined in claim 14 further comprising the step of separating the second group of channels into individual channels.

17. A method as defined in claim 14 further comprising the step of separating the first and second group of channels into individual channels.

\* \* \* \* \*